T. J. STURTEVANT.
SEPARATOR.
APPLICATION FILED JUNE 11, 1918.

1,353,550.

Patented Sept. 21, 1920.
4 SHEETS—SHEET 1.

Inventor:
Thomas J. Sturtevant
by Robt. T. Hawes
Attorney

T. J. STURTEVANT.
SEPARATOR.
APPLICATION FILED JUNE 11, 1918.
1,353,550.
Patented Sept. 21, 1920.
4 SHEETS—SHEET 2.
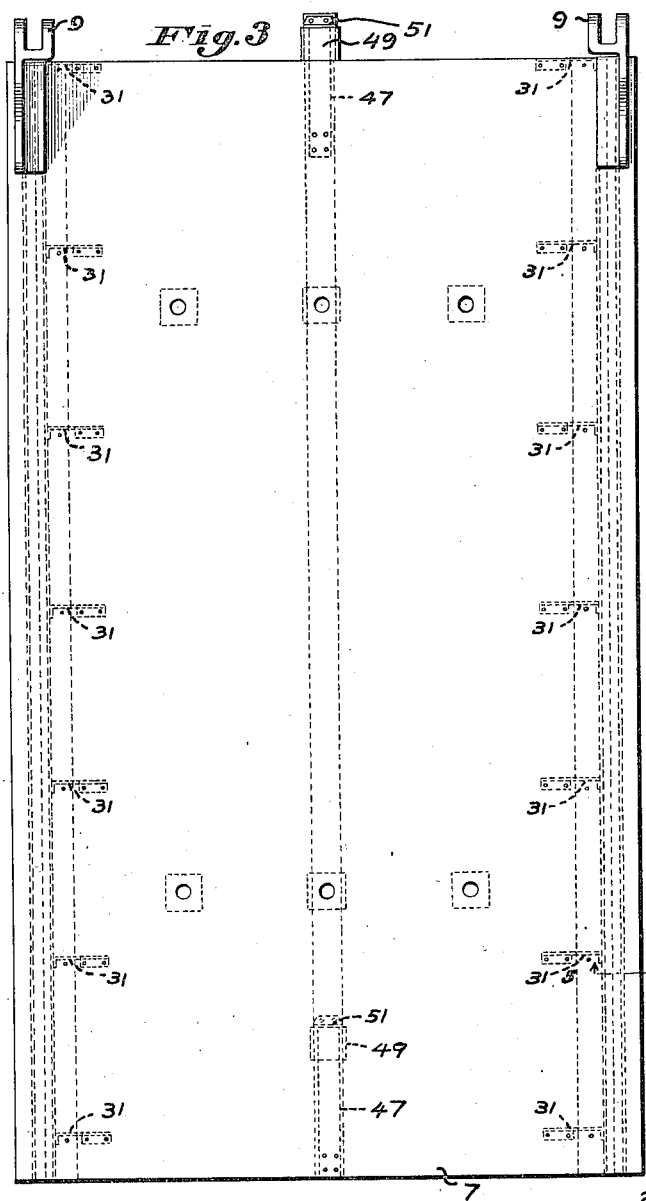
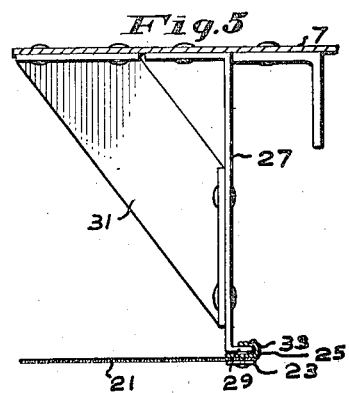
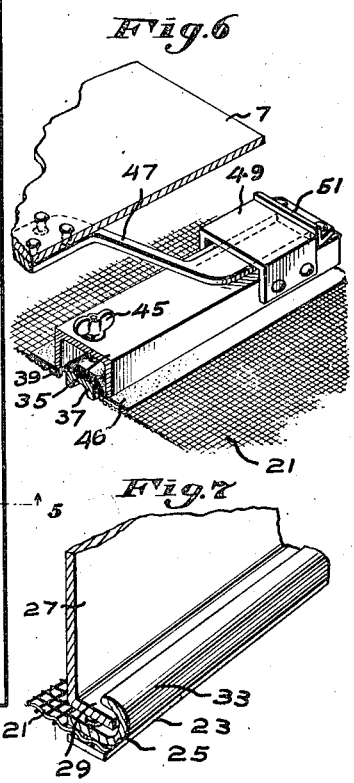
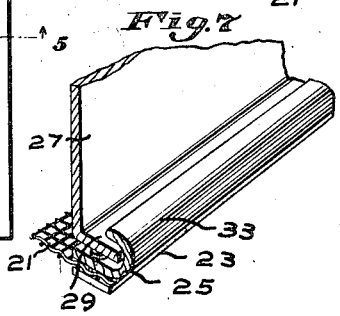
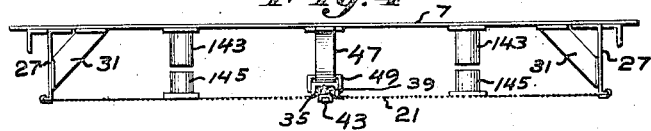
*Inventor:*
Thomas J. Sturtevant
by Robt. P. Harris,
*Attorney*

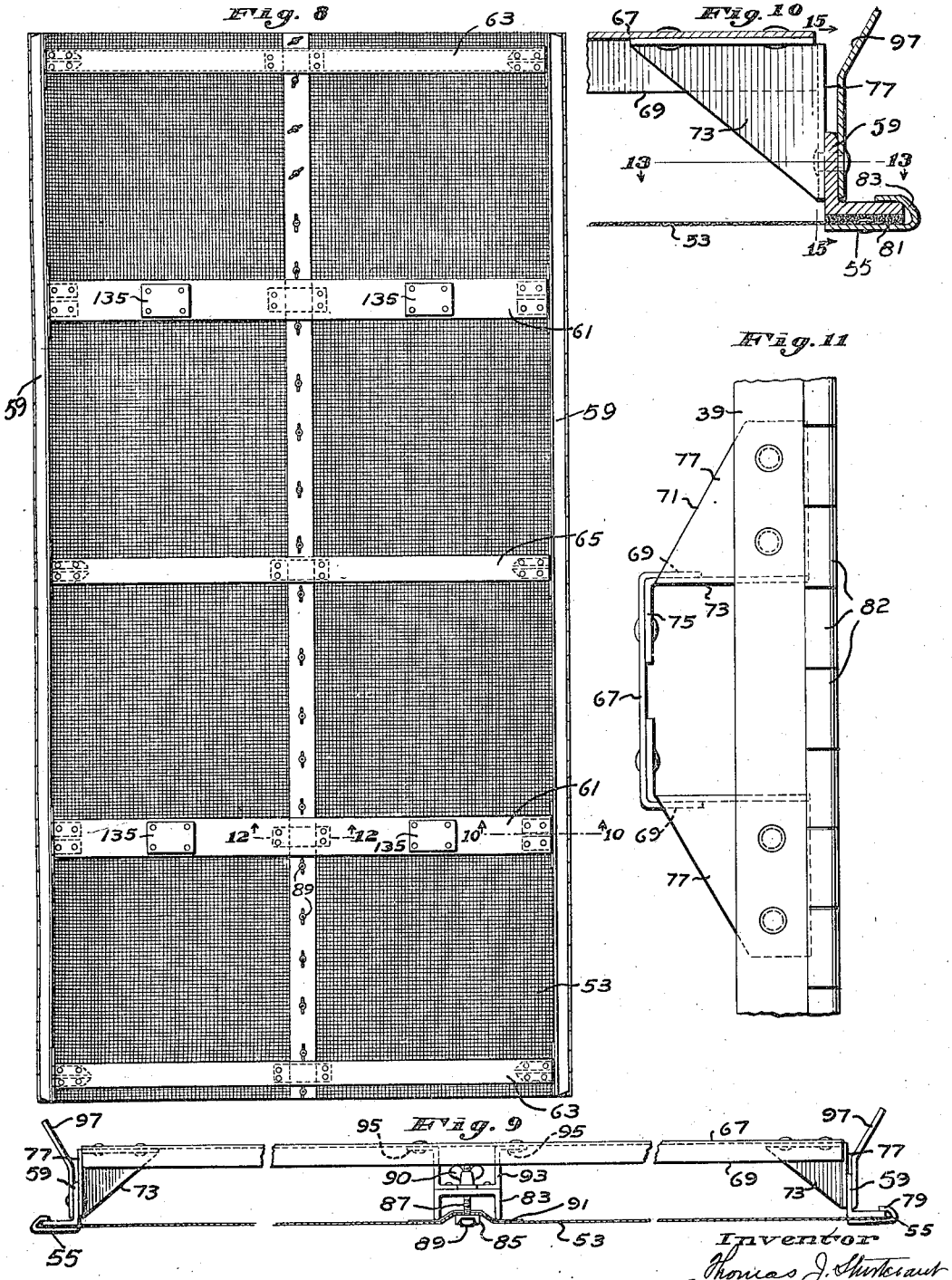

T. J. STURTEVANT.
SEPARATOR.
APPLICATION FILED JUNE 11, 1918.
1,353,550.
Patented Sept. 21, 1920.
4 SHEETS—SHEET 4.
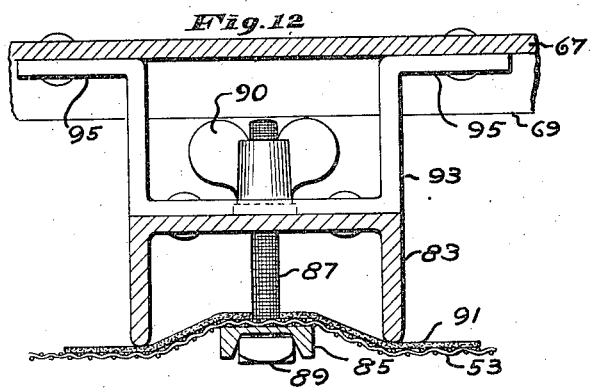
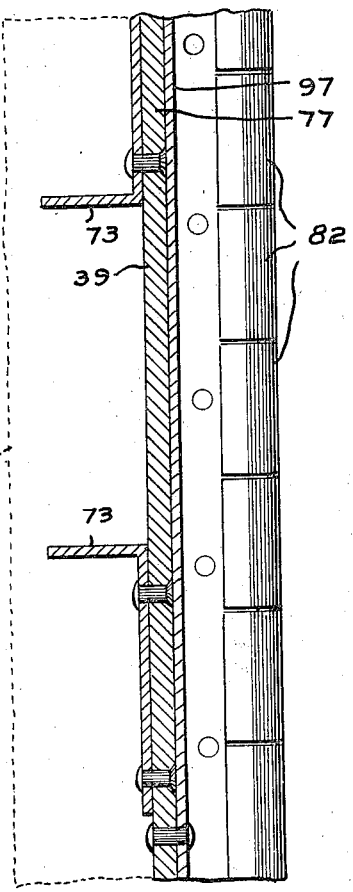
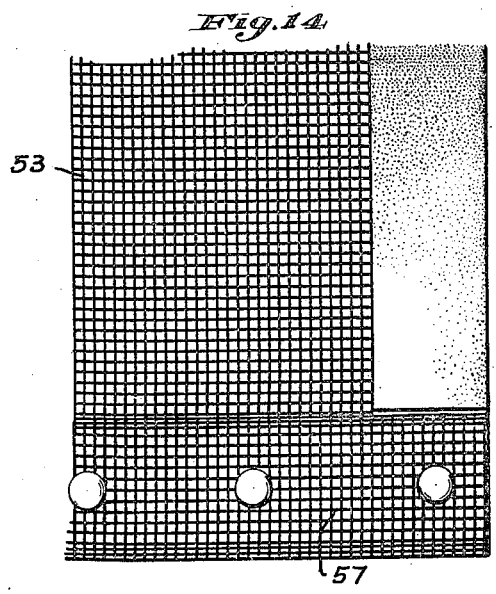
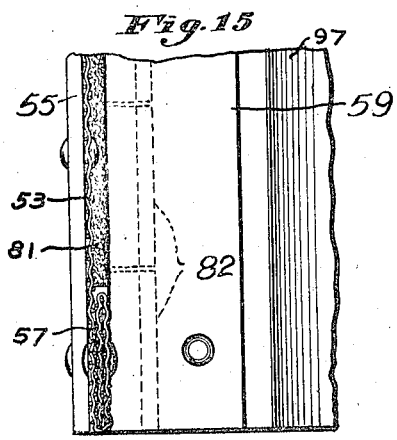
Inventor:
Thomas J. Sturtevant
by Robt. P. Harris
Attorney

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

SEPARATOR.

1,353,550.  Specification of Letters Patent.  Patented Sept. 21, 1920.

Application filed June 11, 1918. Serial No. 239,482.

*To all whom it may concern:*

Be it known that I, THOMAS J. STURTEVANT, a citizen of the United States, residing at Wellesley, county of Norfolk, and State of Massachusetts, have invented an Improvement in Separators, of which the following description, in connection with the accompanying drawings, is a specification, like characters on the drawings representing like parts.

The invention to be hereinafter described relates to separators for grading materials. These separators usually comprise a casing having a feed box at the top thereof provided with a conveyer which delivers the material to be graded to one or more inclined vibrated screens in the casing, the material graded being delivered through outlets at the bottom of the casing.

In my copending application, Serial No. 218,649, filed February 23, 1918, is shown, described and claimed, a separator having a screen for grading materials comprising a frame having opposed side and end members with screen clothing stretched on and secured to said side and end members. The clothing is stretched on the frame by channel bars at opposite sides of the clothing extending longitudinally of the frame, one of said channel bars being connected to the end members of the frame. Bridge bars extend transversely across the frame above the clothing and channel bars, and serve to contribute to the stretching of the clothing and to transmit blows from hammer means to the clothing without engagement of the hammer means with the clothing.

This has been found to be a good, efficient form of construction for certain purposes, but since the clothing is connected to the end members of the frame, stretching of the clothing adjacent said members is more restricted than at points more remote therefrom. One of the objects of the present invention is to provide simple and effective, readily accessible means whereby the clothing may be uniformly stretched throughout.

Another object of the invention is to provide simple and effective means whereby stretching of the clothing from use may be automatically taken up.

Another object is to provide an easily accessible means for detachably connecting the screen clothing to its side supports without necessity for relative adjustment of said supports.

And another object is to provide means for so distributing blows from the hammer means to the clothing as to produce a uniform vibration thereof throughout.

With the aforesaid and other objects in view, the character of the invention will be best understood by reference to the following description of one good form thereof shown in the accompanying drawings, wherein:—

Fig. 3 on an enlarged scale is a plan of the cover of the casing, parts beneath the same being indicated in dotted lines;

Fig. 4 is an end elevation of the construction shown in Fig. 3;

Fig. 5 on an enlarged scale is a section taken on line 5—5 of Fig. 3;

Fig. 6 is a perspective view showing the spring bracket attached to the cover for contributing to the support of the scalper screen;

Fig. 7 on an enlarged scale is a perspective view of a portion of one of the hangers depending from the casing cover, and the hook means for connecting the scalper screen to the hanger;

Fig. 8 on an enlarged scale is a plan of the fine screen;

Fig. 9 on an enlarged scale is an end elevation of the screen shown in Fig. 8;

Fig. 10 on an enlarged scale is a section taken on line 10—10 of Fig. 8;

Fig. 11 is an edge elevation of the construction shown in Fig. 10 with the deflector plate removed;

Fig. 12 on an enlarged scale is a section taken on line 12—12 of Fig. 8;

Fig. 13 is a horizontal section taken on line 13—13 of Fig. 10;

Fig. 14 is a view of a corner portion of the fine screen with the marginal frame member thereof removed; and Fig. 15 is a vertical section taken on line 15—15 of Fig. 10.

Figure 1:
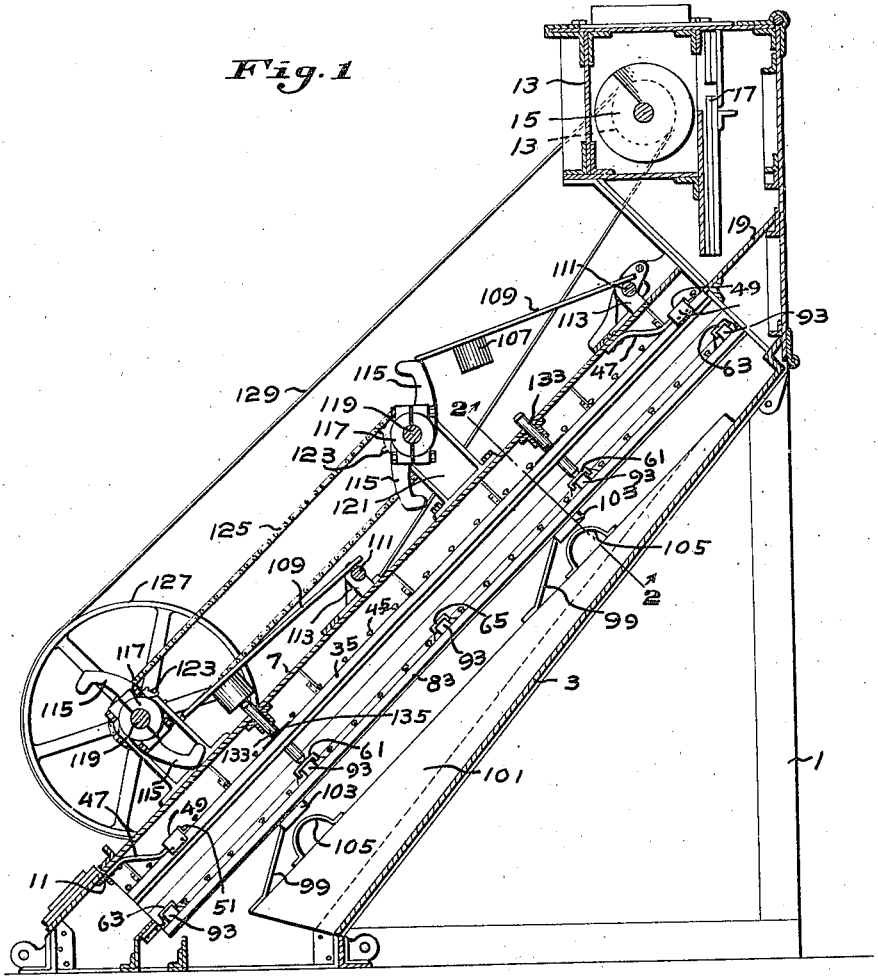
Figure 1 is a vertical section through the separator shown herein as embodying the invention.

Referring to the drawings, the separator shown therein as one good form of the invention, comprises a frame 1 (Fig. 1) having an inclined casing mounted thereon provided with a bottom 3, side walls 5, and a movable cover 7 with its upper end, in the present instance, connected by hinges 9 with the body of the casing. The lower end of the cover may rest upon a transverse member 11 adjacent the lower end of the casing.

A trough or feed box 13 at the top of the casing may contain a screw conveyer 15 adapted to feed the material to be graded along the box over a feed board 17. The material flows thence onto a deflecting plate 19 and is guided thereby to screening means mounted within the casing.

In the present instance of the invention, the screening means comprises an upper or scalper screen and a lower or fine screen, the former delivering the finer material graded thereby to the latter.

Figure 2:
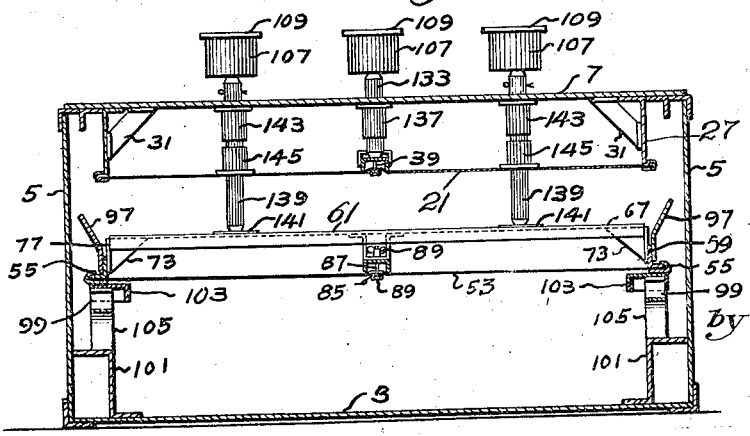
Fig. 2 is a transverse section taken on line 2—2 of Fig. 1.

The upper or scalper screen, in the present form of the invention, comprises screen clothing 21 (Figs. 2, 4 and 7) provided with suitable means to support the same from the cover of the casing. To accomplish this, the side edges of the screen may be interposed between frame members 23 and 25, and secured thereto by rivets projecting through said members and clothing. To support the edges of the screen, hangers 27 conveniently in the form of plates may be provided having their upper ends secured to the cover. These hangers or plates depend from said cover and are formed to present outwardly projecting flanges 29. Preferably the hangers should be rigidly connected to the cover. To this end they may be provided with diagonal braces 31 secured to said plates and cover.

The edges of the screen clothing may be detachably connected to the hangers. To accomplish this, in the present instance, the upper edge frame members 25 may be formed to present hooks 33 adapted to engage the hanger flanges 29. The construction is such that when the cover of the casing is opened, the hook members may be presented to the outer free ends of the hanger flanges 29, and may be slid along said flanges to slide the screen into position beneath the cover.

After the screen has been positioned on the hangers as described, it is desirable to stretch or tension the clothing. Suitable means may be provided for this purpose, in the present instance, in the form of opposed channel bars 35 and 37 (Figs. 2, 4 and 6) which may extend on opposite sides of the screen clothing longitudinally thereof and preferably substantially midway between the side edges of the screen. A series of bolts 39 may be provided at intervals along the length of the channel bars, and extend through said bars and the screen clothing. The bolts may have heads 43 presenting opposed flat faces for engagement with the flanges of the channel 37 to prevent turning of the bolts. The upper ends of the bolts may project somewhat above the upper channel bar 35 and be provided with suitable wing nuts 45. A strip of canvas 46 or other suitable packing material may be interposed between the channels above the clothing to protect the latter from wear which might otherwise be produced by engagement of the flanges of the channel bar 35 with the clothing.

The construction described is such that the bolts 39 may be tightened and thereby draw the lower channel bar toward the upper channel bar, take up the slack in the screen clothing, draw the hook members 33 into tight engagement with the hanger flanges 29, and impart the tension to the screen clothing desired.

It will be noted that the upper and lower edges of the screen clothing are not provided with frame members which might interfere with the stretching of the clothing, reduce the effective screening area of the clothing, and stiffen or impede the free vibration of the clothing.

Suitable means may be provided to relieve the screen clothing from the weight of the stretching channel bars, but without interference with the free vibration of the clothing. To accomplish this, brackets conveniently in the form of leaf springs 47 may be provided secured to the under face of the cover and having their free ends adapted for insertion into pockets, in the present instance, formed by U-shaped metal straps 49 secured to the upper channel 35 adjacent the upper and lower ends thereof. To prevent the screen from sliding downward along its hangers, suitable stops may be provided conveniently in the form of angles 51 secured to the upper channel bar 35 and closing the upper ends of the straps 49. The construction is such that the screen may be slid along its hangers and cause the straps 49 to wipe beneath the free ends of the leaf springs 47 and beyond said ends. Then the screen may be slid downward somewhat to allow the springs to enter the spaces between the straps and the upper channel bar until limited by engagement of the free ends of the springs with the stops 51.

The lower or fine screen, in the present instance of the invention, comprises screen clothing 53 (Figs. 8, 9 and 10) provided with side bars 55 riveted or otherwise secured to said clothing. The upper and lower edges of the screen clothing may be turned in with a double fold, as will be noted at 57 in Fig. 15. This will furnish margins of sufficient strength without the necessity for end bars to strengthen the clothing.

The screen described may be provided with a suitable frame to support the same. In the present instance, this frame comprises side bars 59 conveniently of angle form connected by transverse bridge bars, in the present instance, including a pair of wide bridge bars 61, narrower end bridge bars 63 and an intermediate bridge bar 65, but the number of bridge bars may vary according to the length of the screen and conditions as desired.

Each of these bridge bars, in the present instance, comprises a channed 67 (Figs. 9, 10 and 11) having flanges 69 depending therefrom. The opposite ends of the channel may be connected to the upstanding flanges of the side angle bars 59 by brackets 71, each having a web 73 of triangular form, a flange 75 riveted or otherwise secured to the under face of the back of the channel 67, and a flange 77 riveted or otherwise secured to the upstanding flange of the side angle bar 59. The connections described for the channel bar with the side bars are such that skewing of the side bars is effectively prevented and the flanges 71 of the brackets may engage the outer ends of the flanges 69 of the channel and limit inward movement of the opposed side bars 59 toward one another. The form of the brackets also contributes to this effect.

Suitable means may be provided to detachably connect the screen clothing with the side bars of the frame described. To accomplish this, in the present instance, the edge bars 55 for the screen clothing may be formed to present hooks 79 (Figs. 9, 10, 11 and 12) adapted to embrace the outwardly extending flanges of the frame angle bars 59. To protect the screen clothing and prevent escape of dust beneath said angle bars, packing strips 81 of canvas or other suitable material may be interposed between the hook members 55 and the angle bars 59, as will be noted in Fig. 10. The character of this packing material is such that it will allow the heads of the rivets connecting the clothing to the bars 55 to project into said material. The hooks 79 may be formed to present inclined portions 83 adapted to engage the outwardly projecting flange of the angle bars, and tend to press the packing material upward against the under faces of the angle bars when the clothing is tensioned, as more fully hereinafter described. To facilitate the formation of the hook 79, and to cause the same to intimately engage the outwardly extending flanges of the frame angle bars 59, said hooks may comprise a series of sections 82 (Figs. 11 and 13) conveniently produced by making spaced incisions in the outer margins of the edge bars 55 for the screen clothing. After these margins are incised, the sections may be readily turned over by a mallet to bend the hooks as desired.

Suitable means may be provided for tensioning the screen clothing 53. To accomplish this, in the present instance, channel bars 83 and 85 (Figs. 8 and 9) may be provided on opposite sides of the screen clothing, and extending longitudinally thereof, preferably substantially midway between the side edges of the screen. A series of bolts 87 may be provided at intervals along the length of the channel bars and extend through the same and the screen clothing. Each of these bolts may have a head 89 presenting opposed flat faces for engagement with the flanges of the channed bar 85 to prevent turning of the bolt. The upper end of each bolt may project somewhat above the upper channel bar 83 and be provided with a suitable wing nut 90. A strip 91 of canvas or other suitable packing material may be interposed between the channel bars above the clothing to protect the latter from wear which might otherwise be produced by the engagement of the flanges of the channel bar 83 with the clothing. The construction is such that the bolts 87 may be tightened and thereby draw the lower channel bar toward the upper channel bar, take up the slack in the screen clothing, draw the hook members 55 into tight engagement with the side bars 59 of the frame, and impart the tension to the screen clothing desired.

To contribute to the support of the channel bars 83 and 85, and transmit vibrations thereto, as more fully hereinafter described, they may be connected by U-shaped brackets 93 with the transverse channel bars 61, 63 and 65, referred to. Each of these brackets may have outwardly extending feet 95 fitted between the flanges 69 of the transverse bar, and riveted or otherwise secured to the back of said bar.

To prevent escape of material falling from the upper screen to the lower screen over the side edges thereof, suitable guards or deflecting plates 97 (Fig. 9) may be secured to the upstanding flanges of the angle bars 59 of the fine screen frame.

Suitable means may be provided to support the fine screen frame. To accomplish this, in the present instance, leaf springs 99 (Figs. 1 and 2) may be mounted on Z-bars 101 resting on the bottom 3 of the casing. The screen may rest on the upper free ends of the leaf springs, suitable plates 103 being secured to the under surfaces of the edge members 55 of the screen, and having end and side flanges for engagement with said springs to limit lateral and downward movement of the screen. The downward vibratory movement of the screen may be limited by stops 105 mounted on the Z-bars beneath the free ends of the springs.

Suitable means may be provided to vibrate the screens. To accomplish this, in the present instance, hammers 107 may be secured adjacent lower ends of arms 109 having their upper ends riveted to studs 111 journaled in open bearings in brackets 113 secured to the cover 7 of the casing.

Suitable means may be provided for lifting and dropping the hammers. In the present form of the invention, the hammers may be provided with actuators comprising fingers 115 having curved ends adapted to successively reach in and engage the under faces of the free ends of the hammer arms to lift the same. In the course of the rotation of these actuators, the fingers disengage the hammer arms and allow the hammers to drop sharply downward. These cam fingers, in the present instance, project from split bosses 117 secured to shafts 119 journaled in bearings in brackets 121 secured to the top of the cover. The shafts may be rotated by sprocket wheels 123 fast on said shafts and connected by a sprocket chain 125, one of the shafts 119 having a pulley 127 fast thereon connected by a belt 129 with a pulley 131 on the shaft for the screw conveyer, referred to.

The hammers and the actuators therefor may be substantially the same as described and claimed in my said copending application.

To transmit the blows from the hammers to the upper screen, pins 133 (Figs. 1 and 2) of wood or other suitable material may be provided having lower ends for engagement with base plates 135 secured to the backs of the stretching channels 35 for the upper screen. These pins may be guided by sleeves 137 secured to and depending from the cover 7.

To transmit the blows from the hammers to the lower screen, pins 139 may be provided of wood or other suitable material having lower ends for engagement with base plates 141 secured to the backs of the transverse bars 61 of the lower screen. The pins 139 may project through and be guided by sleeves 143 secured to and depending from the cover, and sleeves 145 secured to the upper surface of the screen clothing for the upper screen.

Since the pins for transmitting the blows to the upper and lower screens engage the channel bars thereof, the screen clothing for the screens is freed from direct contact with the pins, and thus the clothing is desirably protected from direct punching by the pins, such as would produce local strain, distortion and bagging of the clothing.

The blows from the hammers to the upper screen produce vibration of the stretching channel bar 35 throughout the length thereof, and this vibration is transmitted with a desirable uniformity throughout the length of the screen clothing, and unimpeded by the presence of end bars at the upper and lower ends of the screen clothing. As a consequence, a uniform vibratory effect is produced throughout the length of the screen clothing and throughout the areas of the latter at the opposite sides of said channel bar, and the maximum area of the screen clothing becomes available for efficiently screening materials.

If in practice it should be found that certain portions of the screen clothing experience greater wear than others, the bolts 39 adjacent such portions may be adjusted to flex the channels 35 and 37 or one of them relatively to the other to restore the uniform tension to the clothing.

After the upper screen has been worn to such an extent that it is desirable to substitute a new screen therefor, it is merely necessary to release the bolts 35 and allow the hooks 23 to relax their grip on the hangers 27. Then on lifting the cover from the body of the casing, the screen clothing and hooks may be slid longitudinally of the cover from the hangers. Of course, it would be necessary to remove the pins 139 before sliding the screen from said hangers. It will be noted that a minimum number of parts and material is removed in order to remove worn screen clothing. Thus, the expense of maintenance of the separator is desirably reduced.

There are also important advantages in the construction of the fine screen described. Since there are no end frame members directly connected to the screen clothing, the channel bar stretching device may be adjusted to uniformly stretch the clothing throughout the length thereof. The hammer blows are transmitted by the pins to the transverse bars of the screen frame, and the latter transmit their vibrations directly to the side bars, and since the transverse bars are connected by the brackets 93 with the channel stretching device, the vibrations are also transmitted directly thereto. The vibrations received by the side bars and the channel stretching device are transmitted in turn to the screen clothing throughout the length thereof, and thus the clothing may be uniformly vibrated throughout the length thereof, and the entire length of the clothing is available for efficient vibratory screening action.

If in the course of use a portion of the screen clothing should experience greater stretching than other portions thereof, the bolt or bolts 87 adjacent said portion may be adjusted to flex the channel bars 83 and 85 or one of them locally relatively to the other to remove the local stretching.

After the screen clothing has been worn to such an extent that it becomes necessary to substitute new clothing therefor, it is merely necessary to loosen the bolts 87, thereby giving the screen clothing sufficient slack to allow the hook members 55 to be released from the side frame members 59 of the screen either laterally thereof or longitudinally thereof as desired.

It will be noted that portions of the transverse bars are offset from the points of attachment of their ends to the side bars of the screen frame a substantial distance above the screen clothing, thereby allowing free flow of the materials over the screen clothing without obstruction from said transverse bars, and without engagement of the screen clothing with said bars during the vibration thereof. The transverse bars on tensioning of the clothing may arch upward somewhat, so that their tendency to straighten will maintain a desirable tension effect on the screen clothing, and tend to automatically compensate for stretching of the clothing in use.

It will be understood that the invention is not limited to the specific embodiment shown, but that various deviations may be made therefrom without departing from the spirit and scope of the appended claims.

What is claimed is:—

1. In a separator, the combination of a casing having a cover, hangers rigidly secured to and depending from said cover, a screen for grading materials, means to connect said screen with said hangers, and means to stretch said screen after connection thereof with said hangers to secure the screen to said hangers.

2. In a separator, the combination of a casing having a cover, hangers rigidly secured to and depending from said cover, a screen for grading materials carried by said hangers, and means applied to said screen intermediately of said hangers for stretching said screen between said hangers.

3. In a separator, the combination of a casing having a cover, hangers rigidly secured to and depending from said cover, screen clothing for grading materials, members at opposed edges of said clothing for connection with said hangers, and means intermediate said members for stretching said clothing.

4. In a separator, the combination of a casing having a cover, hanger plates depending from said cover having out-turned flanges, a screen having opposed members detachably connected to said flanges, and means to stretch the screen.

5. In a separator, the combination of a casing having a cover, hangers depending from said cover, a screen having edges connected to said hangers, a stretching member extending along said screen intermediate said edges, and means yieldingly connecting said member to said cover.

6. In a separator, the combination of a casing having a cover, hangers depending from said cover, a screen having stiffened side edges connected to said hangers and flexible end edges, and means yieldingly connecting said end edges with said cover.

7. In a separator, the combination of a casing having a cover, hangers depending from said cover, a screen extending between said hangers, means to connect said screen with said hangers, said screen having a flexible portion intermediate said hangers, and means to connect said flexible portion with said cover.

8. In a separator, the combination of a casing having a hinged cover, hangers depending from said cover, a screen for grading materials, means detachably connecting said screen with said hangers, and means detachably connecting said screen with said cover at a point intermediate said hangers.

9. In a separator, the combination of a casing having opposed screen supports therein, a screen for grading materials extending between said supports, means detachably connecting said screen with said supports, a member extending along said screen at substantially the longitudinal central portion of the same, and means coöperating with said member for stretching the screen.

10. In a separator, the combination of a casing having a cover, hangers rigid with said cover, screen clothing extending between and connected to said hangers, and means for stretching said clothing inward away from said hangers.

11. In a separator, the combination of a casing having a cover, a screen carried by said cover, means including a member intermediate opposed edges of said screen to stretch the same, a pin projecting through said cover toward said member, and hammer means for imparting blows to said pin to vibrate the screen.

12. In a separator, the combination of a casing having a cover, a screen for grading materials, means to support the screen from said cover, a member extending along said screen intermediate edges thereof, spring means connecting said member with said cover, a pin projecting through said cover toward said member, and hammer means for imparting blows to said pin to vibrate said screen.

13. A screen for grading materials, comprising a frame having opposed side members and transverse bridge bars connected to said side members, screen clothing beneath said bridge bars, and means detachably connecting said clothing with the side members of said frame, said screen clothing having free, flexible ends.

14. A screen for grading materials, comprising a frame having side members and transverse bridge members connected to said side members, screen clothing, means detachably connecting opposed margins of said clothing with the opposed side members of said frame, and a device for stretching said screen clothing applied thereto intermediate the side members of said frame.

15. A screen for grading materials, comprising a frame having opposed side members and transverse bridge members connected to said side members, screen clothing, means, detachably connecting opposed margins of said clothing with the opposed side members of said frame, a channel member carried by said bridge members, a member opposed thereto, and means for relatively adjusting said channel member and the member opposed thereto for stretching the clothing.

16. A screen for grading materials, comprising a frame having opposed side members and transverse bridge members having ends connected to said side members, and portions intermediate said ends offset upwardly from said side members, screen clothing beneath said bridge members, means detachably connecting opposed margins of said clothing with the side members of said frame, and a stretching device connected to said bridge members and applied to said clothing intermediate the side members of said frame.

17. A screen for grading materials, comprising a frame having opposed side bars and transverse channels connected to said side bars, screen clothing beneath said channel bars, hooks detachably connecting said clothing with said side bars, and a stretching device for said clothing applied thereto intermediate said hooks.

18. A screen for grading materials, comprising a frame having opposed side members and transverse bridge members connected to said side members, screen clothing beneath said bridge members, means detachably connecting the margins of said clothing with the opposed members of said frame, and means applied to said clothing intermediate the side bars of said frame for stretching said clothing uniformly throughout the length thereof, said last mentioned means serving to support said clothing from said bridge members.

19. A screen for grading materials, comprising a frame having opposed side members and transverse bridge members connected to said side members adjacent the ends of the latter, and screen clothing having opposed sides connected to the side members of said frame, said clothing having its ends stretched taut between said side members and free to vibrate relatively to said bridge members.

20. In a separator, the combination of a frame having opposed side members and transverse bridge members connected to said side members, hammer means for imparting blows to said bridge members, and screen clothing having opposed sides connected to the side members of said frame, said clothing being free to vibrate uniformly throughout the length thereof in response to the blows of the hammer means on said bridge members.

21. A screen for grading materials, comprising a frame having opposed side members, transverse bridge members, brackets having outwardly projecting elements connected to said side members and inwardly projecting elements connected to said bridge members, and screen clothing detachably connected to said side members.

22. A screen for grading materials, comprising a frame having opposed side members, transverse bridge members, pairs of brackets connecting the ends of said bridge members with said side members, each of said brackets having three wings for rigidly bracing said bridge members with respect to said side members, and screen clothing connected to said side members.

23. In a separator, the combination of a casing having a movable cover, an upper screen carried by said cover beneath the same, a bar extending longitudinally of said screen intermediate opposed sides thereof, a lower screen beneath said upper screen in said casing, a member extending longitudinally of said lower screen intermediate opposed sides thereof, and means operating through said longitudinal members for vibrating said screens.

24. A screen for grading materials, comprising a frame having opposed side members, and transverse bridge bars connected to said side members, each of said side members provided with a longitudinally extending outwardly directed flange, screen cloth provided with means for slidably securing the clothing to said frame below the bridge bars, comprising longitudinally extending bars secured to the lateral edges of the screen clothing and provided with grooves to receive said outwardly extending flanges, and means supported by the bridge bars and applied to said clothing intermediate the grooved bars for stretching the clothing uniformly throughout the length thereof.

In testimony whereof, I have signed my name to this specification.

THOMAS J. STURTEVANT.